United States Patent [19]
Hardin et al.

[11] Patent Number: 4,941,729
[45] Date of Patent: Jul. 17, 1990

[54] BUILDING CABLES WHICH INCLUDE NON-HALOGENATED PLASTIC MATERIALS

[75] Inventors: Tommy G. Hardin, Lilburn; Behrooz A. Khorramian, Norcross, both of Ga.

[73] Assignee: AT&T Bell Laboratories, Murray Hill, N.J.

[21] Appl. No.: 303,172

[22] Filed: Jan. 27, 1989

[51] Int. Cl.[5] .......................... G02B 6/44; G02B 6/00; H02G 15/02
[52] U.S. Cl. .............................. 350/96.23; 350/96.34; 174/107
[58] Field of Search ...................... 350/96.23; 174/107, 174/74, 121 A

[56] References Cited

U.S. PATENT DOCUMENTS 4,284,842 8/1981 Arroyo et al. ........................ 174/107
4,605,818 8/1986 Arroyo et al. ........................ 174/107

FOREIGN PATENT DOCUMENTS 0054424 10/1986 European Pat. Off. .

OTHER PUBLICATIONS

Article Authored by Messrs. S. Artingstall, A. J. Pyle, and Dr. J. A. Taylor entitled "Recent Advances in Thermoplastic, Zero Halogen, Low Smoke, Fire Retardant Cable Compound Technology".
"Norway's PTT Forces Halogen-Free Alternatives in Cable Covering".
Tender by Telecom Australia dated 9/3/85.
"Extrusion of NORYL Resin PX1766 in the Wire Insulation Process", *Extrusion*.
Allianz Versicherungs-AG Technische Information (1980).
Brochure of the Union Carbide Corporation discloses thermoplastic non-halogen flame retardant material.
General Electric'sNORYL PX1766 undated brochure.
Fire and Flammability Bulletin, vol. 9, No. 7, dated Feb. 1988.

AT&T Practice Standard, Issue 3, Nov. 1987, entitled "Fire Safety Considerations of Cable in Buildings".
"Fire Testing of Riser Cables" by L. J. Przybyla appearing in Vol. 3, Jan./Feb. '85, issue of *Journal of Fire Sciences*.
Article by S. Kaufman entitled "Using Combustion Toxicity Data in Cable Selection", pp. 636-643, 1988 International Wire and Cable Symposium Proceedings (IWCS).
S. Kaufman's article entitled "PVC in Communications Cable", published in the Journal of Vinyl Technology, Sep. '85, vol. 7, #3.
S. Kaufman's article in "The 1987 National Electrical Code Requirements for Cable", beginning at p. 545, IWCS 1986.
"Flammability of Polymers: Test Methods", appears beginning at p. 1797 of the Encyclopedia of Materials Science and Engineering (1986).

(List continued on next page.)

*Primary Examiner*—William L. Sikes
*Assistant Examiner*—Akm E. Ullah
*Attorney, Agent, or Firm*—Edward W. Somers

[57] ABSTRACT

A cable which may be used in buildings in concealed areas such as in plenums or in riser shafts includes a core (22) which includes at least one transmission medium which is enclosed in a non-halogenated plastic material. The core is enclosed with a jacket (28) which also is made of a non-halogenated plastic material. The non-halogenated material which encloses the transmission medium and the jacket is a plastic material selected from the group consisting of a filled polyolefin, a polyetherimide and a silicone-polyimide copolymer, and blend compositions of a polyetherimide and a silicone-polyimide copolymer. Interposed between the core and the jacket is a thermal barrier which includes a plastic film which is selected from the group consisting of a polyetherimide, a silicone-polyimide copolymer, a polyimide, and blend compositions of a polyetherimide and a silicone-polyimide copolymer.

15 Claims, 3 Drawing Sheets

OTHER PUBLICATIONS

Article by R. O. Johnson & H. S. Burlhis entitled "Polyetherimide: A New High-Performance Thermoplastic Resin", p. 129 of the Journal of Polymer Science: Polymer Symposium 70, 129–143 (1983).

Brochures by General Electric entitled "Silicone Polyimide Copolymer Processing Conditions", Combustion Characteristics of ULTEM Resins, dated 1/7/87, Technical Marketing Bulletin-Extrusion Guidelines for ULTEM 1000, dated 4/10/82, 481-XV-40 Silicone-Polyimide Copolymer-Preliminary Silicone Product Info.

Brochure entitled Smoke Density and Toxicity.

Publication by General Electric entitled "ULTEM" Resin Design Guide.

Article from *New Products* entitled "Initial and Secondary Fire Damage Costs".

Article from Telecommunication Journal entitled "Fire Precautions in Telephone Exchanges", vol. 49, 1982, p. 223.

In *Interview* an interview with Hans de Munck entitled "Developing NORYL Resin PX1766".

S. Kaufmann et al., "A Test Method for Measuring and Classifying the Flame Spreading and Smoke Generating Characteristics of Communications Cable".

S. Kaufman, "The 1987 National Electrical Code Requirements for Optical Fiber Cable".

"Cable Catastrophes", The Sentinel, Jul.–Aug. 1979.

BUILDING CABLES WHICH INCLUDE NON-HALOGENATED PLASTIC MATERIALS

TECHNICAL FIELD

This invention relates to building cables which include non-halogenated plastic materials. More particularly, the invention relates to communications cables such as plenum cables which are used in buildings and which include non-halogenated insulation and jacketing materials that exhibit flame spread and smoke generation properties, which are acceptable by industry standards, as well as an acceptable toxicity level and relatively low corrosivity.

BACKGROUND OF THE INVENTION

In the construction of many buildings, a finished ceiling, which is referred to as a drop ceiling, is spaced below a structural floor panel that is constructed of concrete, for example. Light fixtures as well as other items appear below the drop ceiling. The space between the ceiling and the structural floor which it is suspended serves as a return-air plenum for elements of heating and cooling systems as well as a convenient location for the installation of communications cables including those for computers and alarm systems. The latter includes communication, data and signal cables for use in telephones, computer, control, alarm and related systems. It is not uncommon for these plenums to be continuous throughout the length and width of each floor. Also, the space under a raised floor in a computer room is considered a plenum if it is connected to a duct or to a plenum.

When a fire occurs in an area between a floor and a drop ceiling, it may be contained by walls and other building elements which enclose that area. However, if and when the fire reaches the plenum, and if flammable material occupies the plenum, the fire can spread quickly throughout an entire story of the building. The fire could travel along the length of cables which are installed in the plenum if the cables are not rated for plenum use. Also, smoke can be conveyed through the plenum to adjacent areas and to other stories.

A non-plenum rated cable sheath system which encloses a core of insulated copper conductors and which comprises only a conventional plastic jacket may not exhibit acceptable flame spread and smoke evolution properties. As the temperature in such a cable rises, charring of the jacket material begins. Afterwards, conductor insulation inside the jacket begins to decompose and char. If the jacket char retains its integrity, it functions to insulate the core; if not, it ruptures either by the expanding insulation char, or by the pressure of gases generated from the insulation exposed to elevated temperatures, exposing the virgin interior of the jacket and insulation to elevated temperatures. The jacket and the insulation begin to pyrolize and emit more flammable gases. These gases ignite and, because of air drafts within the plenum, burn beyond the area of flame impingement, propagating flame and generating smoke and possibly toxic and corrosive gases.

As a general rule, the National Electrical Code (NEC) requires that power-limited cables in plenums be enclosed in metal conduits. The initial cost of metal conduits for communications cables in plenums is relatively expensive. Also, conduit is relatively inflexible and difficult to maneuver in plenums. Further, care must be taken during installation to guard against possible electrical shock which may be caused by the conduit engaging any exposed electrical service wires or equipment. However, the NEC permits certain exceptions to this requirement provided that such cables are tested and approved by an independent testing agent such as the Underwriters Laboratories (UL) as having suitably low flame spread and smoke-producing characteristics. The flame spread and smoke production of cable are measured using a UL 910 test, Standard Test Method for Fire and Smoke characteristics of Electrical and Optical-Fiber Cables Used in Air-Handling Spaces. See S. Kaufman "The 1987 National Electric Code Requirements for Cable" which appeared in the 1986 International Wire and Cable Symposium Proceedings beginning at page 545.

One prior art plenum cable which includes a core of copper conductors is shown in U.S. Pat. No. 4,284,842 which issued on Aug. 18, 1981 in the names of C. J. Arroyo, N. J. Cogelia and R. J. Darsey. The core is enclosed in a thermal core wrap material, a corrugated metallic barrier and two helically wrapped translucent tapes. The foregoing sheath system, which depends on its reflection characteristics to keep heat away from the core, is especially well suited to larger size copper plenum cables.

The prior art has addressed the problem of cable jackets that contribute to flame spread and smoke evolution also through the use of fluoropolymers. These together with layers of other materials, have been used to control char development, jacket integrity and air permeability to minimize restrictions on choices of materials for insulation within the core. Commercially available fluorine-containing polymer materials have been accepted as the primary insulative covering for conductors and as a jacketing material for plenum cable without the use of metal conduit. In one prior art small size plenum cable, disclosed in application Ser. No. 626,085 filed Jun. 29, 1984 in the names of C. J. Arroyo, et al. and now U.S. Pat. No. 4,605,818, a sheath system includes a layer of a woven material which is impregnated with a fluorocarbon resin and which encloses a core. The woven layer has an air permeability which is sufficiently low to minimize gaseous flow through the woven layer and to delay heat transfer to the core. An outer jacket of an extrudable fluoropolymer material encloses the layer of woven material. In the last-described cable design, a substantial quantity of fluorine, which is a halogen, is used. Fluoropolymer materials are somewhat difficult to process. Also, some of those fluorine-containing materials have a relatively high dielectric constant which makes them unattractive as insulation for communications conductors.

The problem of acceptable plenum cable design is complicated somewhat by a trend to the extension of the use of optical fiber transmission media from a loop to building distribution systems. Not only must the optical fiber be protected from transmission degradation, but also it has properties which differ significantly from those of copper conductors and hence requires special treatment. Light transmitting optical fibers are mechanically fragile, exhibiting low strain fracture under tensile loading and degraded light transmission when bent with a relatively low radius of curvature. The degradation in transmission which results from bending is known as microbending loss. This loss can occur because of coupling between the jacket and the core. Coupling may result because of shrinkage during cooling of the jacket and because of differential thermal contractions when the thermal properties of the jacket material differ significantly from those of the enclosed optical fibers.

The use of fluoropolymers, with or without underlying protective layers, for optical fiber plenum cable jackets requires special consideration of material properties such as crystallinity, and coupling between the jacket and an optical fiber core which can have detrimental effects on the optical fibers. If the jacket is coupled to the optical fiber core, the shrinkage of fluoropolymer plastic material, which is semi-crystalline, following extrusion puts the optical fiber in compression and results in microbending losses in the fiber. Further, its thermal expansion coefficients relative to glass are large, thereby compromising the stability of optical performance over varying thermal operation conditions. Also, the use of fluoropolymers adds excessively to the cost of the cables at today's prices, and requires special care for processing.

Further, a fluoropolymer is a halogenated material. Although there exist cables which include halogen materials and which have passed the UL 910 test requirements, there has been a desire to overcome some problems which still exist with respect to the use of halogenated materials such as fluoropolymers and polyvinyl chloride (PVC). These materials exhibit undesired levels of corrosion. If a fluoropolymer is used, hydrogen fluoride acid forms under the influence of heat, causing corrosion and a high level of toxicity. For a PVC, hydrogen chloride is formed.

Generally, there are a number of halogenated materials which pass the industry tests. However, if halogenated materials exhibit some less than desired characteristics as required by industry standards in the United States, it is logical to inquire as to why non-halogenated materials have not been used for cable materials. The prior art has treated non-halogenated materials as unacceptable because as a general rule they are not as flame retardant or because they are too inflexible if they are flame retardant. Materials for use in communications cables must be such that the resulting cable passes an industry standard test. For example, for plenum cables, this is the UL 910 test. This test is conducted in an apparatus which is known as the Steiner Tunnel. Many non-halogenated plastic materials have not passed this test.

Non-halogenated materials have been used in countries outside the United States. One example of a non-halogenated material that has been offered as a material for insulating conductors is a polyphenylene oxide plastic material. Inasmuch as this material has not passed successfully industry standard tests in the United States for plenum use, ongoing efforts have been in motion to provide a non-halogenated material which has a broad range of acceptable properties, as well as a reasonable price and yet one which passes the UL 910 test for plenum cables. Such a cable should be one which appeals to a broad spectrum of customers.

The sought-after cable not only exhibits suitably low flame spread and low smoke producing characteristics provided by currently used cables which include halogenated materials but also one which meets a broad range of desired properties such as acceptable levels of corrosivity and toxicity. Such a cable does not appear to be available in the prior art. The challenge is to provide a halogen-free cable which meets the standards in the United States for plenum cables. What is further sought is a cable which is characterized as having relatively low corrosive properties, and acceptable toxic properties as well as low levels of smoke generation and one which is readily processable at reasonable costs.

One such cable is that disclosed in copending commonly assigned application Ser. No. 303,212 which was filed of even date herewith in the names of T. G. Hardin and B. A. Khorramian. In it is disclosed a cable in which transmission media are enclosed in a covering material which is selected from the group consisting of a polyetherimide, a silicone-polyimide copolymer and blend compositions of a polyetherimide and a silicone-polyimide copolymer. A jacket which encloses the transmission material is a plastic material which includes a polyetherimide constituent. The cable of the aforementioned application meets UL 910 test requirements for plenum cable and exhibits relatively low corrosivity and an acceptable toxicity level. However, the materials which are used for insulation and jacketing require somewhat more care to process than conventional cable materials such as polyethylenes and polyvinyl chlorides.

What is still sought is a plenum cable which is relatively inexpensive and one in which the materials are relatively easy to process. Inasmuch as polyolefins have been used in many cables and inasmush as there has evolved sophisticated technology for processing same, it would be advantageous if a polyolefin material would be among those that could be used for the material which covers the transmission media and for the jacket.

SUMMARY OF THE INVENTION

The foregoing problems of the prior art have been overcome with the cables of this invention. A cable of this inventiopn comprises a core which includes at least one transmission medium. For communications use, the transmission medium may include optical fiber or metallic conductors. The transmission medium is enclosed with a plastic material and a jacket which comprises a plastic material encloses the at least one transmission medium. The plastic material which encloses the at least one transmission medium and which comprises the material of the jacket is a plastic material which may be a filled polyolefin, a polyetherimide, a silicone-polyimide copolymer or blends of the latter two materials. Also, the cable includes a thermal barrier which is disposed between the at least one transmission medium and said jacket. The thermal barrier is a laminate comprising a suitable metallic material such as aluminum and a plastic material which is selected from the group consisting of a polyetherimide, a silicone-polyimide copolymer, a polyimide, and blend compositions of a polyetherimide and a silicone-polyimide copolymer.

Advantageously, the cables of this invention may be used in building plenums and/or risers. They are acceptable by UL 910 requirements for flame spread and smoke generation. Further, they exhibit suitably low levels of toxicity and, relatively low corrosivity.

BRIEF DESCRIPTION OF THE DRAWING

Other features of the present invention will be more readily understood from the following detailed description of specific embodiments thereof when read in conjunction with the accompanying drawings, in which.

DETAILED DESCRIPTION

Figure 1:
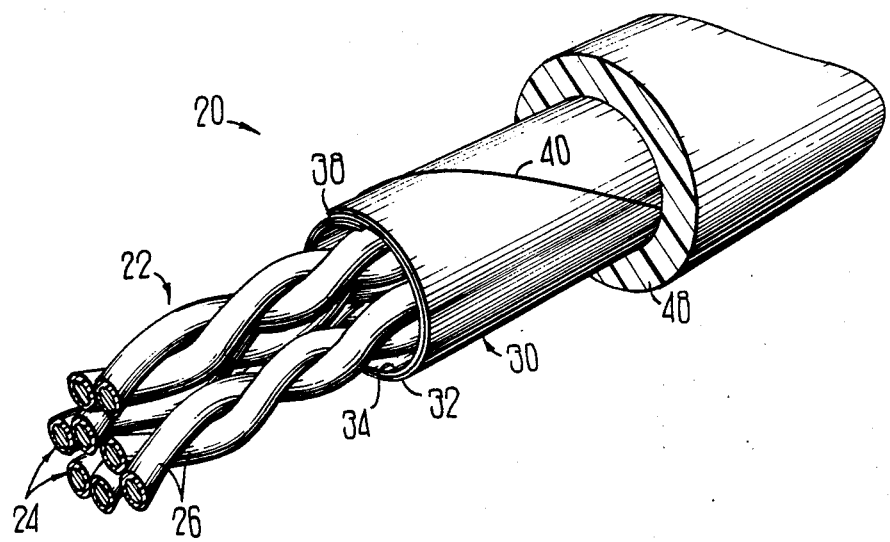
FIG. 1 is a perspective view of a cable of this invention which includes a thermal barrier.
Figure 2:
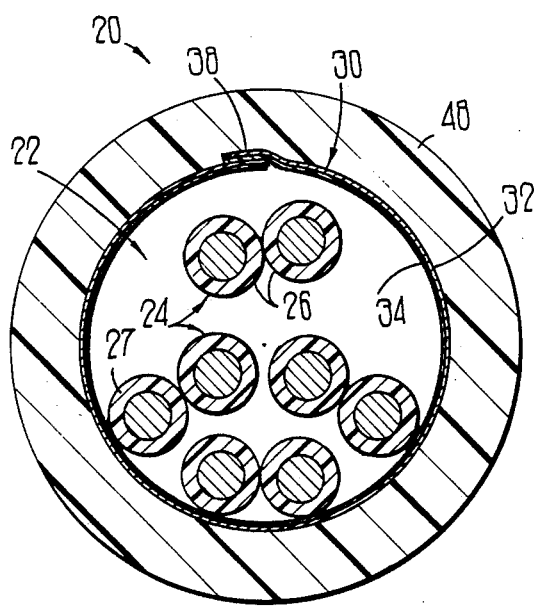
FIG. 2 is an end cross-sectional view of the cable of FIG. 1 with spacing among pairs of conductors being exaggerated.
Figure 3:
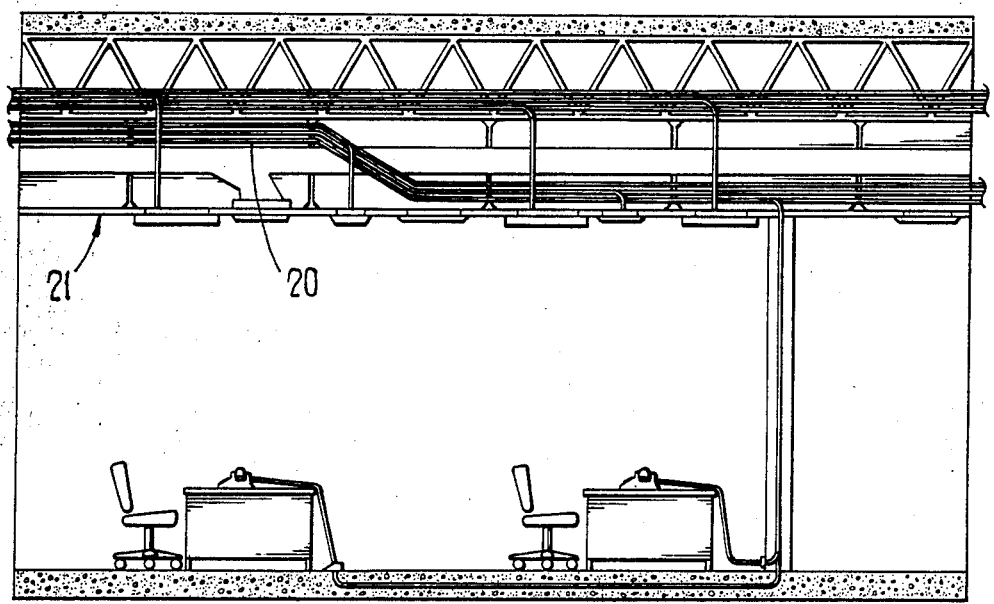
FIG. 3 is an elevational view of a building which includes a plenum, depicting the use of cables of this invention.

Referring now to FIGS. 1 and 2 there is shown a cable which is designated gererally by the numeral 20 and which is capable of being used in buildings in plenums. A typical building plenum 21 is depicted in FIG. 3. There, a cable 20 of this invention is disposed in the plenum. As can be seen in FIGS. 1 and 2, the cable 20 includes a core 22 which comprises at least one transmission medium. The transmission medium may comprise metallic insulated conductors or optical fiber. Also, the core 22 may be enclosed by a core wrap (not shown). The core 22 may be one which is suitable for use in data, computer, alarm and signaling networks as well as in voice communication.

For purposes of the description hereinafter, the transmission medium comprises twisted pairs 24–24 of insulated metallic conductors 26–26. Although some cables which are used in plenums may include twenty-five or more conductor pairs, many such cables include as few as six, four, two or even single conductor pairs.

In order to provide the cable 20 with flame retardancy, low toxicity, low corrosivity and low smoke generation properties, the metallic conductors are insulated with a plastic material which provides those properties. The metallic conductors may be provided with an insulation cover 27 which is selected from the group consisting of a filled polyolefin, a polyetherimide, a silicone-polyimide copolymer, or blend compositions of a polyetherimide and a silicone-polyimide. A preferred embodiment includes conductors which are insulated with a filled polyolefin material.

A polyolefin is a polymeric material comprising mainly hydrogen and carbon. Examples of polyolefins suitable for use in cables of this invention include polyvinyl acetate and a copolymer of ethylene and butene. Fillers which may be used with the polyolefin to enhance the flame retardancy of the material include antimony trioxide and metal hydroxides, for example. Examples of metal hydroxides which are suitable for the filled polyolefin composition include magnesium hydroxide and aluminum hydroxide, for example. In one filled polyolefin, the composition includes about 5% by weight of antimony trioxide whereas in another, the composition includes about 20% by weight to about 70% by weight of magnesium hydroxide. Further, a filled polyolefin may be a composition comprising a polyolefin, antimony trioxide and a metal hydroxide with the combined weight of the antimony trioxide and the metal hydroxide not exceeding about 70% by weight of the filled polyolefin composition.

Polyetherimide is an amorphous thermoplastic resin which is available commercially from the General Electric Company under the designation ULTEM ® resin. The resin is characterized by high deflection temperature of 200° c. at 264 psi, a relatively high tensile strength and flexural modulus and very good retention of mechanical properties at elevated temperatures. It is inherently flame resistant without the use of other additions and has a limiting oxygen index of 47.

Polyetherimide is a polyimide having other linkages incorporated into the polyimide molecular chain to provide sufficient flexibility to allow suitable melt processability. It retains the aromatic imide characteristics of excellent mechanical and thermal properties. Polyetherimide is described in an article authored by R. O. Johnson and H. S. Burlhis entitled "Polyetherimide: A New High-Performance Thermoplastic Resin" which appeared beginning at page 129 in the 1983 Journal of Polymer Science.

As mentioned, the insulation may be a silicone-polyimide copolymer. A suitable material is a silicone-polyetherimide copolymer which is a copolymer of siloxane and etherimide. A silicone-polyimide copolymer such as SILTEM TM copolymer which is marketed by the General Electric Company is a flame resistant, non-halogenated containing thermoplastic. It has a tensile strength of 4000 psi and a Gardner impact of 120 inch pounds. Further, the silicon-polyimide copolymer has an oxygen index of 46.

In the blend compositions, the polyetherimide may range from about 0 to about 100% by weight of the composition. The silicon-polyimide composition also may range from about 0% to about 100% by weight of the compositions.

Figure 4:
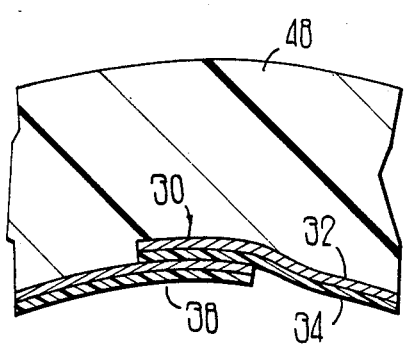
FIG. 4 is a detail view of a portion of the thermal barrier of the cable of FIGS. 1 and 2.

About the insulated conductors is disposed a thermal barrier 30. The thermal barrier 30 is a laminate (see also FIG. 4) comprising a highly reflective metallic material 32 such as, for example, aluminum and a layer 34 of a plastic material. The plastic material of the layer 34 is a non-halogenated metarial selected from the group consisting of a polyetherimide, a silicone-polyimide copolymer, a polyimide, and blend compositions of a polyetherimide and a silicone-polyimide copolymer. In a preferred embodiment, the laminate is non-corrugated and has a metal thickness of 0.001 inch and a plastic layer thickness of 0.001 inch.

The thermal barrier 30 is disposed about the core to enclose the core. As can be seen in FIG. 1, the laminate is wrapped about the core to form a longitudinal overlapped seam 38 or it may be wrapped helically about the core. In a preferred embodiment, the laminate 30 is caused to be disposed about the core such that the metallic portion of the laminate faces outwardly.

For purposes of heat reflection, a major surface of the laminate has an emissivity in the range of about 0.039 to 0.057. The thermal barrier effectively containerizes the core and resists compression of the core. This is a desirable feature in that undesired compression of an optical fiber core may result in unacceptable losses.

Also, the cable includes a binder 40 which is wrapped about the longitudinally wrapped thermal barrier. The binder is used to hold together the thermal barrier and the core and may be comprised of fiberglass or KEVLAR ® yarn.

About the core and the thermal barrier is disposed a jacket 48. The jacket 48 is comprised of a plastic material, such as the filled polyolefin which is used as the insulation cover for the metallic conductors. For expected pair sizes, the jacket 48 typically has a thickness of about 0.020 inch.

It should be noted that the jacketing may comprise materials other than filled pololefin plastic materials. For example, the insulation and/or the jacket may be a composition comprising a polyetherimide, a silicone-polyimide copolymer or a composition comprising a blend of a polyetherimide and a silicone-polyimide copolymer with each constituent of the composition ranging from about 0% to about 100% by weight. In the preferred embodiment, the jacket comprises a filled polyolefin material.

Figure 5:
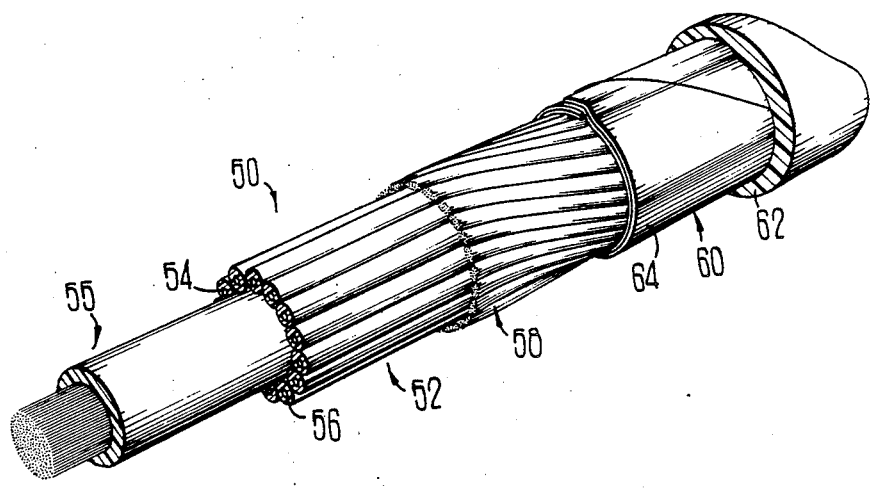
FIGS. 5 and 6 are perspective and end cross-sectional views of an alternate embodiment of a cable of this invention.
Figure 6:
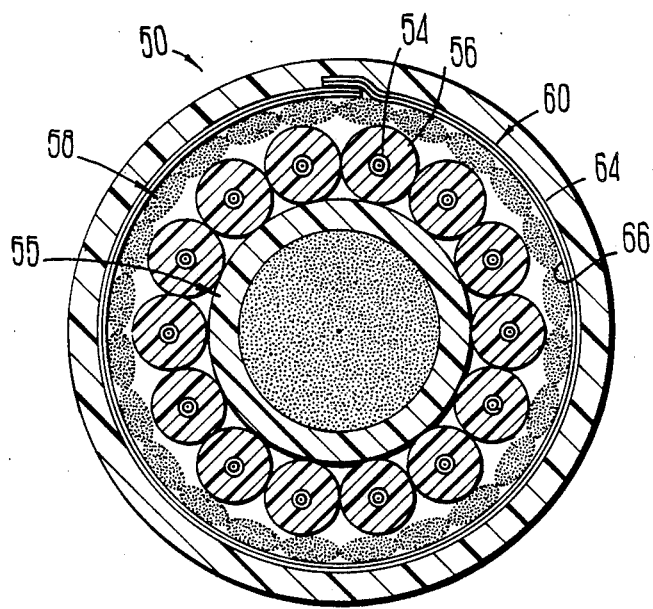

Although the cables of this invention have been disclosed thus far as including twisted pairs of metallic conductors, it is within the scope of this invention to provide a cable 50 (see FIGS. 5 and 6) which includes a core 52 comprising optical fibers 54-54. The optical fibers 54-54 are arrayed about a centrally disposed organizer 55. For optical fiber cables in which the optical fibers 54-54 are provided with a buffer layer 56, a silicone-polyimide copolymer is preferred as the material for the buffer layer. The silicone-polyimide copolymer has more flexibility than a polyetherimide thereby reducing the possibility of inducing microbending loss into the optical fibers. The core 52 is enclosed in a strength member system 58, in a thermal barrier 60 and in a jacket 62. In a preferred embodiment, the strength member system comprises a strength member layer such as KEVLAR ® yarn for example. As in the metallic conductor cable 20, the thermal barrier 60 includes a layer 64 of a highly reflective metallic material such as aluminum and a film 66 of a non-halogenated material. Materials which are suitable for the film 66 include a polyetherimide, a polyimide, a silicone-polyimide copolymer or blends of a polyetherimide and a silicone-polyimide copolymer. The jacket comprises a non-halogenated material. For the jacket 62, a filled polyolefin, a polyetherimide, a silicon-polyimide copolymer or blend compositions of a polyetherimide and a silicone-polyimide copolymer is used.

In the past, the cable industry in the United States evidently has shied away from the use of non-halogenated materials for use in plenum cables. Those non-halogenated materials which possess desired flame retardance and smoke generation properties seemingly were too inflexible to be used in such a product whereas those non-halogenated materials which had the desired amount of flexibility did not meet the relatively high United States standards for plenum cables. What is surprising is that the insulation and jacketing materials of the cables of this invention include non-halogenated materials and meet all NEC requirements for plenum use. Further, at least the cables of the preferred embodiment are sufficiently flexible to meet low temperature bend tests which are standard in the industry for cables.

Surprisingly, the cables of this invention which include non-halogenated insulation and jacketing materials that meet acceptable standards for flame retardancy, and smoke generation also have relatively low corrosivity and an acceptable level of toxicity. The result is surprising and unexpected because it has long been thought that non-halogenated materials would not provide at least the same flame retardancy and smoke generation which are provided by halogenated materials and which satisfy industry standards in the United States. The conductor insulation and the jacketing material cooperate to provide a system which delays the transfer of heat to the transmission members. Because conductive heat transfer, which decomposes conductor insulation, is delayed, smoke emission and further flame spread are controlled.

Tests have shown that heat is transferred into the cable core 22 principally by thermal radiation, secondly by conduction and finally by convection. The outwardly facing surface of the thermal barrier 30 cooperates with the jacket to provide a reflective system. Advantageously, the metallic barrier functions not only to conduct heat away from the point of conflagration, but also functions to reflect heat which has been directed inwardly through the jacket.

The thermal barrier 30 of the cable of FIG. 1 and the jacket 48 delay the conduction of heat to the core. Also, the thermal barrier 30 reflects energy away from the core thereby adding to the delay. By delaying conductive heat transfer, which decomposes conductor insulation, flame spread and hence smoke emission are controlled.

Flame spread and smoke evolution characteristics of cables may be demonstrated by using the well known Steiner Tunnel test in accordance with ASTM E-84 as modified for communications cables and now referred to as the UL 910 test. The aforementioned UL test is described in the previously identified article by S. Kaufman and is a test method for detemining the relative flame propagation and smoke generating characteristics of cable to be installed in ducts, plenums, and other spaces used for environmental air.

During the Steiner Tunnel test, flame spread is observed for a predetermined time and smoke is measured by a photocell in an exhaust duct. For a cable to be rated as plenum, i.e. type CMP, according to the National Electric Code, flame spread must not exceed five feet. A measure of smoke evolution is termed optical density which is an obscuration measurement over a length of time as seen by an optical detector. The lower the optical density, the lower and hence the more desirable is the smoke characteristic. A cable designated CMP must have a maximum smoke density which is 0.5 or less and an average smoke density which is 0.15 or less.

Low toxicity generating characteristics of cables may be demonstrated by a toxicity test developed by the University of Pittsburgh. In this test, a parameter referred to as $LC_{50}$ which is the lethal concentration of gases generated from the burning of a material which causes a 50% mortality among the animal population, that is, 2 out of 4 test animals, for example, is measured. $LC_{50}$ is an indication of the toxicity of a material caused by smoke generated upon its burning. The higher the value of the $LC_{50}$, the lower the toxicity. A higher value indicates that more material must be burned to kill the same number of test animals. It is important to recognize that $LC_{50}$ is measured for the plastic material used in the cable without the metallic conductors. The $LC_{50}$ values of cables of this invention were higher than those for comparable plenum cables having halogenated insulation and jacketing materials.

Low corrosion characteristics of the cables may be demonstrated by the measurement of the percent of acid gases generated from the burning of the cables. The higher the percent of acid gas generated, the more corrosive is the plastic material which encloses the transmission media. This procedure is currently being used in a United States government military specification for shipboard cables. In that specification, 2% acid gas as measured in terms of hydrogen chloride generated per weight of cable is the maximum allowed. Plenum cable of this invention, with one exception, exhibited 0% of acid gas generation, the exception being 0.3%.

Test results for example cables of this invention as well as for similar plenum cables having halogenated materials for insulation and jacketing are shown in TABLE I hereinafter. Being plenum rated, the cables of TABLE I pass the UL 910 test for flame spread and smoke generation.

Example cables were subjected to tests in a Steiner Tunnel in accordance with priorly mentioned UL 910 test and exposed to temperatures of 940° C., or incident heat fluxes as high as 63 kw/m$^2$.

TABLE I

| PLENUM CABLE | HALO-GENATED | | NON HALO-GENATED | |
|---|---|---|---|---|
| EXAMPLE | 1 | 2 | 3 | 4 |
| PROPERTY | | | | |
| A. Smoke generation | | | | |
| max optical density | 0.276 | 0.300 | 0.134 | 0.180 |
| avg. optical density | 0.112 | 0.057 | 0.026 | 0.031 |
| B. Corrosivity | | | | |
| % acid-gas generation | 42.20 | 30.79 | 0 | 0.29 |
| C. LC$_{50}$ (grams) | 25 ± 7 | 12 ± 2 | 41 ± 7 | 31 ± 8 |
| D. Outside Diameter (inch) | 0.139 | 0.140 | 0.187 | 0.208 |
| E. Jacket thickness (inch) | 0.010 | 0.012 | 0.023 | 0.021 |

Each of the cables in TABLE I included four pairs of 24 gauge copper conductors each having a 0.006 inch insulation cover. The insulation and jacket of Example No. 3 are comprised of a filled polyolefin. For Example, No. 4, the insulation was a composition comprising 50% by weight of a polyetherimide and 50% by weight of a silicone-polyimide copolymer, whereas the jacket was a filled polyolefin. The filled polyolefin for the insulation of Example 3 comprised polyvinyl acetate and about 50-70% by weight of magnesium hydroxide. For the jacket materials of Examples 3 and 4, the filled polyolefin comprised a blend of polyvinyl acetate, about 50-70% by weight of magnesium hydroxide and about 0-5% by weight of antimony trioxide. In each of Examples 3 and 4, the thermal barrier comprised a 0.001 inch layer of aluminum and a 0.001 inch film of a polyimide.

Cables of this invention also are suitable for use in building risers. Risers are vertical runs in the form of shafts in buildings in which cables for example are disposed. The cables may extend from basement service entry locations to building floors where they are connected to plenum cables for example. UL 1666 test for cables which are rated for riser use is less stringent than those for plenum use. For example, flame height must not exceed twelve feet with the temperature at the top of the heat column not exceeding a value of 850° F. There is no smoke requirement for riser cable.

A comparison of smoke, corrosivity and toxicity data for one cable having halogen-containing insulation and jacketing and for one in which those materials were non-halogenated are disclosed in TABLE II.

TABLE II

| PROPERTY | HALO-GENATED | NON HALO-GENATED |
|---|---|---|
| Max Optical Density | 3.30 | 0.29 |
| % Acid gas generation | 34.57 | 1.60 |
| LC$_{50}$ (grams) | 24 ± 11 | 49 ± 6 |

Again, the cables tested in a riser environment each included four pairs of 24 gauge metallic conductors. The halogenated insulation and jacketing materials were polyvinyl chloride whereas the non-halogenated materials comprised a filled polyolefin.

The cables of this invention include transmission media covers and jackets which have a range of thickness. But in each case, the cable passes the flame retardancy and smoke characteristics tests which are required today by the UL 910 test as well as provide relatively low corrosivity and acceptably low toxicity.

It is to be understood that the above-described arrangements are simply illustrative of the invention. Other arrangements may be devised by those skilled in the art which will embody the principles of the invention and fall within the spirit and scope thereof.

We claim:

1. A communication cable, which comprises:
    a core which comprises at least one transmission medium;
    a plastic material which encloses said at least one transmission medium;
    a jacket which comprises a plastic material and which encloses said at least one transmission medium;
    said plastic material which encloses said at least one transmission medium and said plastic material of said jacket each including a plastic material which is selected from the group consisting of a filled polyolefin, a polyetherimide, a silicone-polyimide copolymer, and blend compositions of a polyetherimide and a silicone-polyimide copolymer; and
    a thermal barrier which is disposed between said at least one transmission medium and said jacket, said thermal barrier being a laminate comprising a layer of a metallic material and a layer of a plastic material which is selected from the group consisting of a polyetherimide, a silicone-polyimide copolymer, a polyimide, and blend compositions of a polyetherimide and a silicone-polyimide copolymer.

2. The cable of claim 1, wherein said filled polyolefin is a composition which comprises a polyolefin plastic material and a filler which is selected from the group consisting of antimony trioxide, a metal hydroxide, and blend compositions of antimony trioxide and a metal hydroxide.

3. The cable of claim 2, wherein said filler comprises antimony trioxide which comprises five percent by weight of said filled polyolefin.

4. The cable of claim 2, wherein said filler comprises a metal hydroxide which comprises about 20 to about 70% by weight of said filled polyolefin.

5. The cable of claim 2, wherein said filler includes aluminum hydroxide.

6. The cable of claim 2, wherein said filler includes magnesium hydroxide.

7. The cable of claim 1, wherein said metallic material of said thermal barrier faces outwardly.

8. The cable of claim 7, wherein said metallic material of the laminated thermal barrier has an emissivity in the range of about 0.039 to 0.057.

9. The cable of claim 7, wherein said metallic material of the laminated thermal barrier is aluminum.

10. The cable of claim 7, wherein each layer of said thermal barrier has a thickness of about 0.001 inch.

11. The cable of claim 1, wherein said cable also includes a binder which is wrapped about said thermal barrier.

12. The cable of claim 11, wherein said binder comprises a fiberglass material.

13. The cable of claim 11, wherein said binder comprises an aramid yarn material.

14. The cable of claim 1, wherein said thermal barrier is wrapped about said core to include a longitudinal overlapped seam.

15. The cable of claim 1, wherein said thermal barrier is wrapped helically about said core.

* * * * *